(12) United States Patent
Peng

(10) Patent No.: US 11,759,296 B2
(45) Date of Patent: Sep. 19, 2023

(54) METHOD FOR GENERATING A DIGITAL DATA SET REPRESENTING A TARGET TOOTH ARRANGEMENT

(71) Applicant: NINGBO SHENLAI MEDICAL TECHNOLOGY CO., LTD., Ningbo (CN)

(72) Inventor: Xuefeng Peng, Chengdu (CN)

(73) Assignee: NINGBO SHENLAI MEDICAL TECHNOLOGY CO., LTD., Ningbo (CN)

(*) Notice: Subject to any disclaimer, the term of this patent is extended or adjusted under 35 U.S.C. 154(b) by 169 days.

(21) Appl. No.: 17/393,377

(22) Filed: Aug. 3, 2021

(65) Prior Publication Data

US 2023/0039130 A1 Feb. 9, 2023

(51) Int. Cl.
*A61C 9/00* (2006.01)
*G06T 7/00* (2017.01)
*G06T 17/00* (2006.01)
*G06N 3/044* (2023.01)

(52) U.S. Cl.
CPC .......... *A61C 9/0053* (2013.01); *G06N 3/044* (2023.01); *G06T 7/0012* (2013.01); *G06T 17/00* (2013.01); *G06T 2207/20084* (2013.01); *G06T 2207/30036* (2013.01)

(58) Field of Classification Search
CPC .... A61C 9/0053; G06N 3/044; G06T 7/0012; G06T 17/00; G06T 2207/20084; G06T 2207/30036
See application file for complete search history.

(56) References Cited

U.S. PATENT DOCUMENTS

| | | | | |
|---|---|---|---|---|
| 6,152,731 A | * | 11/2000 | Jordan | A61C 13/0003 433/69 |
| 11,000,348 B2 | * | 5/2021 | Nonboe | A61C 7/002 |
| 2007/0207441 A1 | * | 9/2007 | Lauren | A61C 13/0004 433/213 |
| 2012/0015316 A1 | * | 1/2012 | Sachdeva | G16H 40/20 382/128 |
| 2015/0235412 A1 | * | 8/2015 | Adamson | A61C 9/0053 382/154 |
| 2018/0333231 A1 | * | 11/2018 | Somasundaram | A61C 19/05 |
| 2019/0378344 A1 | * | 12/2019 | Long | A61C 13/0004 |
| 2020/0085548 A1 | * | 3/2020 | Reynard | A61B 6/032 |
| 2020/0100871 A1 | * | 4/2020 | Wang | B29C 33/3835 |
| 2020/0302127 A1 | * | 9/2020 | Liu | G06N 3/044 |
| 2020/0305808 A1 | * | 10/2020 | Ezhov | A61B 6/4085 |

(Continued)

*Primary Examiner* — Abderrahim Merouan
(74) *Attorney, Agent, or Firm* — Birch, Stewart, Kolasch & Birch, LLP

(57) ABSTRACT

In one aspect of the present application, there is provided a computer-implemented method for generating a digital data set representing a target tooth arrangement, the method comprises: obtaining a first and a second 3D digital models respectively representing upper jaw teeth and lower jaw teeth under an initial tooth arrangement, where the first and the second 3D digital models are in a predetermined relative position relationship; extracting features from the first and the second 3D digital models; generating a first digital data set representing a target tooth arrangement of the upper jaw teeth and the lower jaw teeth based on the extracted features using a trained recurrent neural network based deep learning neural network.

16 Claims, 2 Drawing Sheets

(56) References Cited

U.S. PATENT DOCUMENTS

| | | | | |
|---|---|---|---|---|
| 2021/0153986 A1* | 5/2021 | Wirjadi | ............... | A61C 13/0004 |
| 2021/0251723 A1* | 8/2021 | Raslambekov | ........ | G06T 7/0012 |
| 2021/0286977 A1* | 9/2021 | Chen | ......................... | G06T 17/00 |
| 2022/0084267 A1* | 3/2022 | Ezhov | ..................... | G06V 10/82 |
| 2022/0142740 A1* | 5/2022 | Shojaei | ................... | G16H 50/50 |
| 2022/0323190 A1* | 10/2022 | Kopelman | ............... | A61C 7/002 |

* cited by examiner

METHOD FOR GENERATING A DIGITAL DATA SET REPRESENTING A TARGET TOOTH ARRANGEMENT

FIELD OF THE APPLICATION

The present application generally relates to a method for generating a digital data set representing a target tooth arrangement.

BACKGROUND

Shell-shaped repositioners made of polymer materials become more and more popular due to their advantages on aesthetic appearance, convenience and hygiene. A set of shell-shaped repositioners usually includes a dozen of or even tens of successive shell-shaped repositioners for incrementally repositioning a patent's teeth from an initial tooth arrangement to a target tooth arrangement, where there are N successive intermediate tooth arrangements from a first intermediate tooth arrangement to a final intermediate tooth arrangement between the initial tooth arrangement and the target tooth arrangement.

A common method for fabricating shell-shaped repositioners is forming on a series of successive positive models using a thermoforming process. The series of successive positive models are fabricated based on a series of successive 3D digital models, respectively, which are generated based on a series of successive digital data sets representing a series of successive tooth arrangements from the first intermediate tooth arrangement to the target tooth arrangement, respectively.

A common method of obtaining the series of successive digital data sets includes: first, obtain a 3D digital model representing the initial tooth arrangement (i.e. the patient's tooth arrangement before the orthodontic treatment) by scanning, then obtain a 3D digital model representing the target tooth arrangement (i.e. the tooth arrangement to be achieved by the orthodontic treatment) by manually manipulating the 3D digital model representing the initial tooth arrangement, and then generate the series of successive intermediate tooth arrangements by interpolating based on the initial and the target tooth arrangements.

However, it is time-consuming and laborious to obtain a 3D digital model representing a target tooth arrangement by manually manipulating a 3D digital model representing an initial tooth arrangement, and it is subject to and strongly dependent on the operator's skill, as a result, it is difficult to ensure the consistency of results. In view of the above, it is necessary to provide a computer-implemented method of generating a digital data set representing a target tooth arrangement.

SUMMARY

In one aspect, the present application provides a computer-implemented method for generating a digital data set representing a target tooth arrangement, the method comprises: obtaining a first and a second 3D digital models respectively representing upper jaw teeth and lower jaw teeth under an initial tooth arrangement, where the first and the second 3D digital models are in a predetermined relative position relationship; extracting features from the first and the second 3D digital models; generating a first digital data set representing a target tooth arrangement of the upper jaw teeth and the lower jaw teeth based on the extracted features using a trained recurrent neural network based deep learning neural network.

In some embodiments, the predetermined position relationship may be occlusal state.

In some embodiments, the computer-implemented method for generating a digital data set representing may further comprise: calculating a displacement for each tooth in the first and the second 3D digital models; and generating the first digital data set based on the calculated displacements.

In some embodiments, the features may comprise local feature vectors of individual teeth and a global feature vector of all teeth as a whole.

In some embodiments, the deep learning neural network may comprise a local feature extraction module for extracting the local feature vectors and a global feature extraction module for extracting the global feature vector.

In some embodiments, a basic unit that constitutes the features may comprise a central point and a normal vector of a facet.

In some embodiments, the deep learning neural network may comprise an encoding module and a decoding module, the encoding module may be a bidirectional recurrent neural network which couples the feature vectors in two opposite directions along a predetermined tooth sequence, and the decoding module may be a unidirectional recurrent neural network which generates the first digital data set based on vectors obtained by the couplings.

In some embodiments, the deep learning neural network may further comprise an attention module configured to calculate for each tooth an influence of poses of other teeth on its own pose based on a hidden state and vectors obtained from each step of coupling in the encoding module, and the decoding module may generate the first digital data set based on the vectors obtained from each step of coupling and the calculated influences.

In some embodiments, an input of a recurrent unit corresponding to tooth #t of the encoding module comprises vectors Lt and G, where Lt stands for a local feature vector of tooth #t, and the G stands for a global feature vector of all teeth as a whole.

In some embodiments, an input of a recurrent unit corresponding to tooth #t of the decoding module may comprise vectors TMt-1, Lt, G, Olt and Og, where TMt-1 stands for a displacement vector of a previous tooth in the tooth sequence which represents a displacement of the previous tooth from the initial tooth arrangement to the target tooth arrangement, Olt stands for a vector obtained from coupling step #t in the encoding module, and Og stands for the final vector of the step by step coupling of the encoding module.

In some embodiments, a loss function used in the training of the deep learning neutral network may comprise two components: a transformation loss which indicates a difference of poses between teeth under a predicted target tooth arrangement and the teeth under a ground truth target tooth arrangement, and a relative position relationship loss which indicates a difference between relative position relationships between the teeth under the predicted target tooth arrangement and relative position relationships between the teeth under the ground truth target tooth arrangement.

BRIEF DESCRIPTION OF THE DRAWINGS

The above and other features of the present application will be further illustrated below with reference to figures and their detailed depictions. It should be appreciated that these figures only show several exemplary embodiments according to the present application, so they should not be construed as limiting the protection scope of the present application. Unless otherwise specified, the figures are not necessarily drawn to scale, and like reference numbers therein denote like components.

DETAILED DESCRIPTION OF ILLUSTRATED EMBODIMENTS

Figure 1:
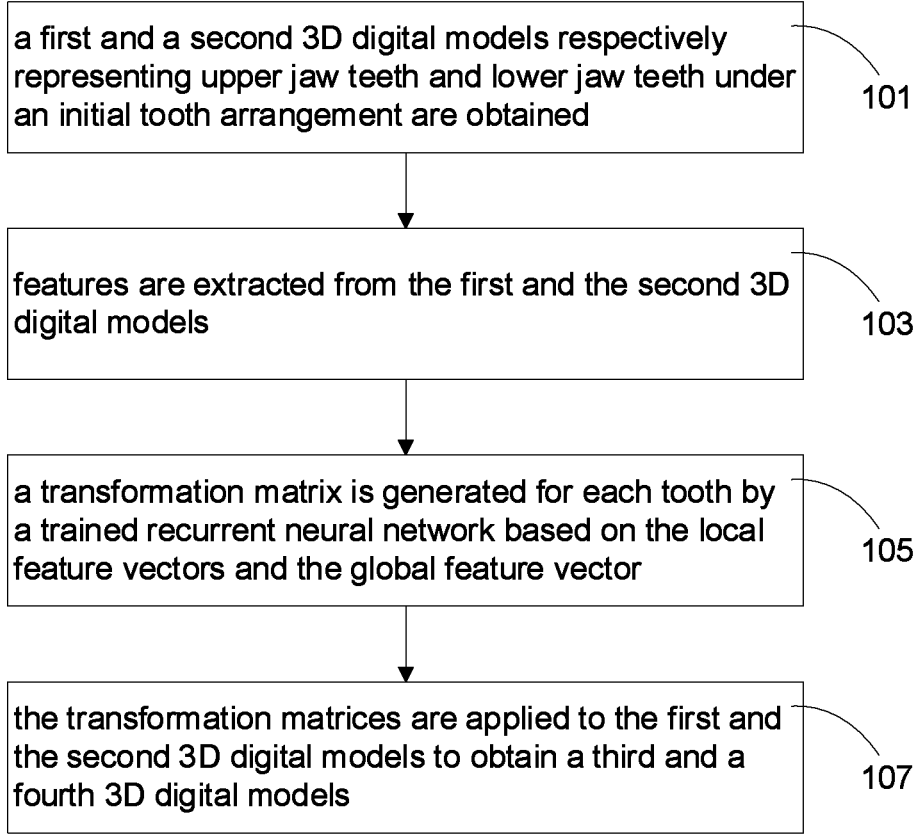
FIG. 1 is a schematic flowchart of a computer-implemented method for generating a digital data set representing a target tooth arrangement.

In the following detailed depiction, reference is made to the accompany drawings, which form a part thereof. Exemplary embodiments in the detailed description and figures are only intended for illustration purpose and not meant to be limiting. Inspired by the present application, those skilled in the art can understand that other embodiments may be utilized and other changes may be made, without departing from the spirit or scope of the present application. It will be readily understood that aspects of the present application described and illustrated herein can be arranged, replaced, combined, separated and designed in a wide variety of different configurations, all of which are explicitly contemplated and make part of the present application.

Recurrent neural networks are widely used in the field of natural language processing such as semantic understanding, text generation and machine translation due to its superior performance on ordered data processing and generating. The Inventors of the present application discover after experiments and tests that if teeth in an oral cavity are regarded as objects arranged in order, a recurrent neural network is able to learn characteristics of poses of teeth under such arrangement. The pose of a tooth describes the position and orientation of the tooth in 3D space. Positional relationships between teeth in an oral cavity is like relationships between words in a sentence, there are strongly correlated inherent connections. The pose of a tooth may affect the poses of neighboring teeth and other teeth, so rules of aligning teeth in oral cavities can be fitted using a recurrent neural network.

In one embodiment, a sequence to sequence network model may be employed which is widely used in machine translation. Under the scenario of machine translation, an input of the network model is a sentence A consisting of N words, a corresponding output of the network model is a sentence B consisting of M words, and A and B have the same meaning in different languages. For example, if A is "hello, good morning", B may be " 你好, 早上好 ". Likewise, under the scenario of teeth aligning, an input of the model may be a sequence of unaligned teeth, and a corresponding output may be a sequence of aligned teeth.

One aspect of the present application provides a method for generating a digital data set representing a target tooth arrangement based on a recurrent neural network. In one embodiment, a digital data set representing a target tooth arrangement may be a set of coordinates of teeth under the target tooth arrangement. In another embodiments, a digital data set representing a target tooth arrangement may be a 3D digital model of teeth under the target tooth arrangement.

Dental orthodontic treatment is a process of repositioning teeth from an initial tooth arrangement to a target tooth arrangement. It is understood that a target tooth arrangement is a tooth arrangement to be achieved by an orthodontic treatment; an initial tooth arrangement may be a patient's tooth arrangement before orthodontic treatment, or a patient's current tooth arrangement based on which a target tooth arrangement is generated.

Referring to FIG. 1, it shows a schematic flowchart of a computer-implemented method 100 for generating a digital data set representing a target tooth arrangement.

In one embodiment, to better positional relationships between upper jaw teeth and lower jaw teeth under an obtained target tooth arrangement, the upper teeth and lower jaw teeth may be processed as a whole, and positional relationships between the upper jaw teeth and lower jaw teeth can be taken into consideration in the prediction of the target tooth arrangement.

In 101, a first 3D digital model and a second 3D digital model respectively representing upper jaw teeth and lower jaw teeth under an initial tooth arrangement are obtained.

In one embodiment, a 3D digital model of teeth under an initial tooth arrangement may be obtained by directly scanning a patient's jaws. In another embodiment, the 3D digital model of the teeth under the initial tooth arrangement may be obtained by scanning a mockup of the patient's jaws such as a plaster model. In a further embodiment, the 3D digital model of the teeth under the initial tooth arrangement may be obtained by scanning an impression of the patient's jaws.

In one embodiment, after the 3D digital model representing the teeth under the initial tooth arrangement is obtained, the 3D digital model may be segmented such that the teeth in the 3D digital model are independent of each other so that each tooth in the 3D digital model may be moved individually.

In one embodiment, to facilitate calculation, the pose of each tooth in the first and the second 3D digital models may be determined by a combination of a global coordinate system and a local coordinate system, i.e., each tooth has its own local coordinate system, and the pose of the tooth may be determined by a combination of its orientation in its local coordinate system and position of its local coordinate system in the global coordinate system.

Figure 2:
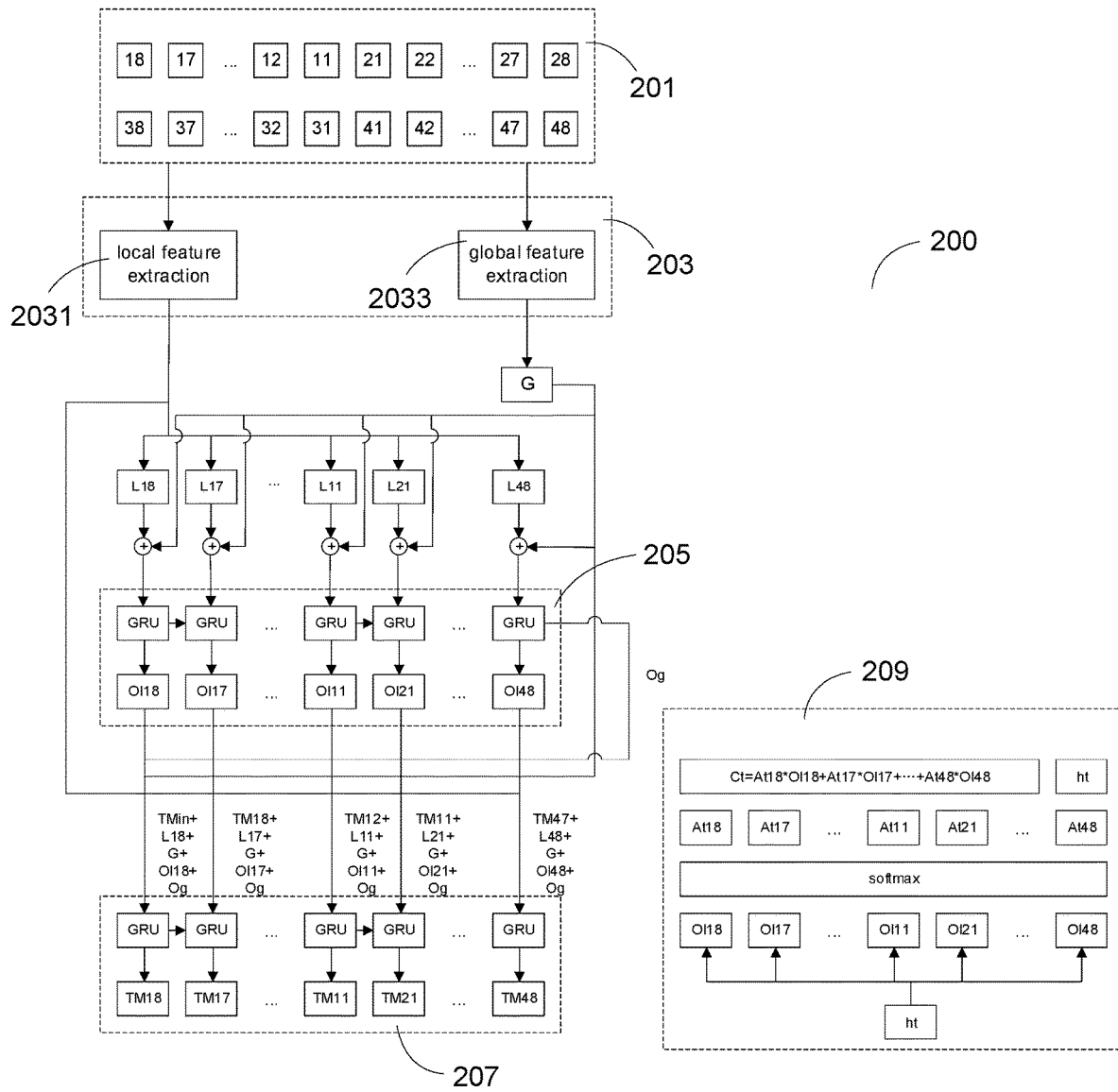
FIG. 2 schematically illustrates the structure of a recurrent neural network in one embodiment of the present application.

Referring to FIG. 2, it schematically illustrates the structure of a deep learning neural network 200 for generating a digital data set representing a target tooth arrangement in one embodiment of the present application. The deep learning neural network 200 mainly includes the following modules: an input module 201, a feature extraction module 203, an encoding module 205, a decoding module 207 and an attention module 209. The method of present application will be described in detail below with reference to FIG. 1 and FIG. 2.

In 103, features are extracted from the first and second 3D digital models.

If there is no missing tooth, a human being usually has 32 teeth, with 16 teeth on each of the upper and lower jaws. In one embodiment, the teeth may be sequentially numbered to facilitate processing. In one embodiment, the teeth may be numbered in an 8-8 manner, i.e., the upper jaw teeth may be numbered in a sequence of 18, 17 . . . 12, 11, 21, 22 . . . 27, 28 from left to right, and the lower jaw teeth may be numbered in a sequence of 38, 37 . . . 32, 31, 41, 42 . . . 47, 48 from left to right.

The input model 201 receives 3D digital models of individual teeth as the input of the deep learning neural network 200, where the numbers 18, 17 . . . 12, 11, 21, 22 . . . 27, 28, 38, 37 . . . 32, 31, 41, 42 . . . 47, 48 in the input module 201 in FIG. 2 respectively stand for the 3D digital models of individual teeth.

In one embodiment, the feature extraction model 203 includes a local feature extraction module 2031 and a global feature extraction module 2033, where the local feature extraction module 2031 extracts a local feature vector Lt for each individual tooth, and the global feature extraction module 2033 extracts a global feature vector G for all the upper jaw teeth and lower jaw teeth as a whole, where t stands for tooth number.

To take relative position relationships between upper jaw teeth and lower jaw teeth into consideration in generation of a digital data set representing a target tooth arrangement, each pair of 3D digital models respectively representing upper jaw teeth and corresponding lower jaw teeth to be processed by the deep learning neural network 200 shall be in a predetermined relative position relationship. In one embodiment, the predetermined relative position relationship may be occlusal state (upper jaw teeth and lower jaw teeth are closed). Inspired by the present application, it is understood that besides occlusal state, the predetermined relative position relationship may be other suitable relative position relationships, for example, a position relationship obtained by moving one of the two jaws, which are in occlusal state, from the other by a predetermined distance toward a predetermined direction. When relative position relationships between upper jaw teeth and lower jaw teeth are taken into consideration in the generation of a digital data set representing a target tooth arrangement, relative position relationships between the upper jaw teeth and the lower jaw teeth under the resultant target tooth arrangement are more ideal. In the following examples, unless otherwise specifically specified, each pair of 3D digital models of upper jaw teeth and lower jaw teeth are in occlusal state.

In one embodiment, a Dynamic Graph Convolutional Neural Network (DGCNN) feature extractor may be used as the local feature extraction module 2031 and global feature extraction module 2033. It is understood that besides the DGCNN feature extractor, any other suitable feature extractor may be used, for example, a feature extractor based on Multilayer Perceptron (MLP).

In one embodiment, the local feature extraction module 2031 uniformly and non-repetitively samples a first predetermined number of facets (e.g., 800 facets, it is understood that the first predetermined number can be determined based on the design of the deep learning neural network 200) from the 3D digital model of each individual tooth. If the number of facets of a 3D digital model of a tooth is less than the first predetermined number, repeated sampling may be performed to obtain the first predetermined number of sampled facets. Then, feature extraction may be performed for each sampled facet. In one embodiment, the following feature may be extracted from each sampled facet: coordinates of a central point of the facet and a normal vector of the facet. Inspired by the present application, it is understood that in addition to the above two features, other features may also be extracted from each facet, for example, coordinates of vertices of the facet. After feature extraction of all sampled facets of tooth #t, the extracted features are encoded to form the local feature vector Lt.

The global feature extraction module 2033 uniformly and non-repetitively samples a second predetermined number of facets (e.g., 6000 facets, it is understood that the second predetermined number can be determined based on the design of the deep learning neural network 200) from the first and second 3D digital models as a whole. Then, the same features may be extracted from each sampled facet. After feature extraction of all the sampled facets, the extracted features are encoded to form the global feature vector G.

In a further embodiment, sampling and feature extraction may be performed only once for the first and the second 3D digital models, i.e., results of the sampling and feature extraction of the 3D digital models of individual teeth may be combined as a result of sampling and feature extraction of the first and second 3D digital models as a whole.

In 105, a transformation matrix is generated for each tooth using a trained recurrent neural network based on the local feature vectors and the global feature vector.

The encoding module 205, the decoding module 207 and the attention module 209 may be taken as a whole and referred to as a recurrent neural network.

The encoding module 205 is a bidirectional encoding module based on recurrent neural network. In one embodiment, the encoding module 205 may be a bidirectional Gated Recurrent Unit (GRU) model. Inspired by the present application, it is understood that besides the bidirectional Gated Recurrent Unit model, the encoding module 205 may also be other suitable models, e.g. a bidirectional Long Short Term Memory (LSTM) network.

In one embodiment, the local feature vector L of each tooth of the upper jaw teeth and lower jaw teeth is concatenated with the global feature vector G, and then the concatenated feature vectors of all teeth are further concatenated to obtain an overall feature vector S as the input of the encoding module 205.

The encoding module 205 couples the feature vectors in S step by step in the initial input order to generate a vector Og1, and then couples the feature vectors in S step by step in a reverse order to generate a vector Og2. Then take the average of Og1 and Og2 which average is referred to as vector Og.

Upon forward coupling step #t corresponding to tooth #t, the encoding module 205 generates a vector Ol1t which contains feature information of the feature vectors from a starting position to position #t. Similarly, the encoding module 205 generates a vector Ol2t upon reverse coupling step #t. Take the average of Ol1t and Ol2t, which average is referred to as vector Olt.

Briefly speaking, the encoding module 205 extracts features of each tooth and positional relationships between the teeth. The encoding module 205 couples the feature vectors of the teeth step by step in two opposite directions along the tooth sequence, by doing so, for each tooth, influences of teeth on both sides are fully considered, making the target tooth arrangement generated subsequently more reasonable.

The decoding module 207 is a unidirectional decoding module based on recurrent neural network. In one embodiment, the decoding module 207 may be a unidirectional Gated Recurrent Unit model. Inspired by the present application, it is understood that besides unidirectional Gated Recurrent unit model, the decoding module 207 may be other suitable models, e.g., a unidirectional Long Short Term Memory (LSTM) network.

TMt-1, Lt, G, Olt and Og are concatenated as an input It of the decoding module 207. The decoding module 207 will generate a transformation matrix TMt corresponding to tooth #t, where the pose of tooth #t is obtained by transforming its initial pose (i.e., its pose under the initial tooth arrangement) with the transform matrix TMt.

The TMt-1 is a transformation matrix of a previous tooth in the tooth sequence. If t=0, the TMt-1 may be a fixed identity matrix. After It is input, the unidirectional gated recurrent unit model generates and outputs a hidden state ht.

Then, ht is sent to the attention module 209. The attention module 209 performs dot multiplications of the input ht and each Olt to obtain 32 values, then fits a valid probability distribution through a softmax layer based on the 32 values, where the probabilities of the teeth are referred to as attention values At18, At17 . . . At47, At48, respectively (equivalent to weights of influences of the teeth on the target pose of tooth #t). Then, element-wise multiplication of these attention values and every Olt is performed to obtain a context vector Ct.

In one embodiment, Ct is output to the decoding module 207. After Ct is concatenated with ht, a 9-digit array is generated through a linear layer (equivalent to a single layer perceptron, not shown in FIG. 2) in the decoding module 207, where the first six digits are rotations of the transformation matrix TMt, and the last three digits are translations of the transformation matrix TMt. It is understood that the format of the array is not limited to the above example, for example, the first three digits may be translations, and the last six digits may be rotations.

The decoding module 207 generates a transformation matrix for each of the teeth, and the teeth under the initial tooth arrangement can be moved to their target poses using corresponding transformation matrices to obtain the upper jaw teeth and the lower jaw teeth under the target tooth arrangement.

In the embodiment, the attention module 209 may be regarded as a part of the decoding module 207.

In one embodiment, a loss function employed in the training of the deep learning neutral network 200 may include two components: one is a transformation loss marked as $R_{loss}$, which indicates a difference between a predicted transformation matrix and a ground truth (i.e. a transformation matrix in a training set); the other is a relative position relationship loss marked as Loss, which indicates a difference between relative position relationships between the teeth under a tooth arrangement (a predicted target tooth arrangement) obtained by transforming using the predicted transform matrix and relative position relationships between the teeth under a tooth arrangement (a ground truth target tooth arrangement) obtained by transforming using the ground truth transformation matrix. Therefore, the loss function may be written as the following Equation (1):

$$\text{Loss}=a*R_{loss}+b*T_{loss} \quad \text{Equation (1)}$$

where a and b stand for the weights of $R_{loss}$ and $T_{loss}$, respectively. In one example, a and b may be given the value 1.

In one embodiment, $T_{loss}$ may include the following two parts: (1) a difference between relative position relationships between each tooth and its correlated teeth under the predicted target tooth arrangement and relative position relationships between each tooth and its correlated teeth under the ground truth target tooth arrangement, hereinafter referred to as a local relative position relationship loss; and (2) a difference between relative position relationship between the upper jaw teeth as a whole and the lower jaw teeth as a whole under the predicted target tooth arrangement and relative position relationship between the upper jaw teeth as a whole and the lower jaw teeth as a whole under the ground truth target tooth arrangement, hereinafter referred to as a global relative position relationship loss.

In one embodiment, the following method may be used to calculate the local relative position relationship loss.

First, a teeth graph is constructed and marked as TG, wherein correlated teeth are tagged for each tooth. The correlations in the graph may include: adjacent along left-right direction; adjacent along up-down direction; and symmetrical. For example, teeth #13 and #15 are adjacent teeth along left-right direction of tooth #14, tooth #34 is an adjacent tooth along up-down direction of tooth #14, and tooth #24 is a symmetrical tooth of tooth #14.

Then, for each tooth of the upper jaw teeth and lower jaw teeth under the ground truth target tooth arrangement, a correlated tooth set R is identified from TG, and then the following calculations are performed for tooth #t and each tooth r in its corresponding correlated tooth set Rt:
 (a) for the central point of each sampled facet on tooth r, identify a closest point on tooth #t, and calculate the shortest distance;
 (b) similarly, for the central point of each sampled facet on tooth #t, identify a closest point on tooth r, and calculate the shortest distance.

All the shortest distances calculated in (a) and (b) are put in a set D.

The same operation as the above is performed for the upper jaw teeth and lower jaw teeth under the predicted target tooth arrangement to obtain a distance set D'.

Then, the L2 distance of the D and the D' is calculated, and is taken as the loss of tooth #t. After that, the losses of all teeth are averaged to obtain the local relative position relationship loss.

In one embodiment, a difference between a first distance and a second distance is taken as the global relative position relationship loss, where the first distance is a distance between the center of gravity of the upper jaw teeth as a whole and the center of gravity of the lower jaw teeth as a whole under the ground truth target tooth arrangement, and the second distance is a distance between the center of gravity of the upper jaw teeth as a whole and the center of gravity of the lower jaw teeth as a whole under the predicted target tooth arrangement.

Similarly, $T_{loss}$ may be a weighted sum of the local relative position relationship loss and the global relative position relationship loss. In one embodiment, the weights of the local relative position relationship loss and the global relative position relationship loss may be set to 0.01 and 0.1, respectively.

By including the relative position relationship loss in the loss function, it enables the deep learning neural network 200 to fully consider relative position relationships between the teeth in training. As a result, positional relationships between teeth under target tooth arrangements predicted by such-trained deep learning neural network 200 are more reasonable.

In one embodiment, a training set may include multiple sets of data, and each set of data may include 3D digital models of upper jaw teeth and lower jaw teeth in occlusal state under their initial tooth arrangements and 3D digital models of upper jaw teeth and lower jaw teeth in occlusal state under their target tooth arrangements. It is understood that a target tooth arrangement is equivalent to a corresponding transformation matrix because the teeth under the target tooth arrangement may be obtained by transforming the teeth under the initial tooth arrangement using the transformation matrix.

In 107, the poses of the teeth in the first and second 3D digital models are altered using the transformation matrices, to obtain a third and fourth 3D digital models.

The third and fourth 3D digital models respectively represent the upper jaw teeth and the lower jaw teeth under the target tooth arrangement.

The deep learning neural network 200 predicts a transformation matrix for each tooth, and the poses of the teeth in the first and second 3D digital models are altered using these transformation matrices, to obtain the 3D digital models of the upper teeth and lower teeth under the target tooth arrangement.

It is understood that besides transformation matrices, the deep learning neural network 200 may also be modified to directly generate/predict the poses (coordinates) of teeth under target tooth arrangements.

While various aspects and embodiments have been disclosed herein, other aspects and embodiments will be apparent to those skilled in the art, inspired by the present application. The various aspects and embodiments disclosed herein are for illustration only and are not intended to be limiting, and the scope and spirit of the present application shall be defined by the following claims.

Likewise, the various diagrams may depict exemplary architectures or other configurations of the disclosed methods and systems, which are helpful for understanding the features and functions that can be included in the disclosed methods and systems. The claimed invention is not restricted to the illustrated exemplary architectures or configurations, and desired features can be achieved using a variety of alternative architectures and configurations. Additionally, with regard to flow diagrams, functional descriptions and method claims, the order in which the blocks are presented herein shall not mandate that various embodiments of the functions shall be implemented in the same order unless otherwise the context specifies.

Unless otherwise specifically specified, terms and phrases used herein are generally intended as "open" terms instead of limiting. In some embodiments, use of phrases such as "one or more", "at least" and "but not limited to" should not be construed to imply that the parts of the present application that do not use similar phrases intend to be limiting.

We claim:

1. A computer-implemented method for generating a digital data set representing a target tooth arrangement, comprising:
    obtaining a first and a second 3D digital models respectively representing upper jaw teeth and lower jaw teeth of a patient under an initial tooth arrangement, wherein the first and the second 3D digital models are in a predetermined relative position relationship;
    extracting features from the first and the second 3D digital models;
    generating a first digital data set represent a target tooth arrangement based on the extracted features using a trained recurrent neural network based deep learning neural network, wherein a loss function used in the training of the deep learning neutral network comprises two components: a transformation loss which indicates a difference of poses between teeth under a predicted target tooth arrangement and the teeth under a ground truth target tooth arrangement, and a relative position relationship loss which indicates a difference between relative position relationships between the teeth under the predicted target tooth arrangement and relative position relationships between the teeth under the ground truth target tooth arrangement.

2. The method of claim 1, wherein the predetermined relative position relationship is occlusal state.

3. The method of claim 1 further comprising:
    calculating a displacement for each tooth in the first and second 3D digital models based on the extracted features using the trained deep learning neural network; and
    generating the first digital data set based on the calculated displacements.

4. The method of claim 1, wherein the features comprise local feature vectors of individual teeth and a global feature vector of all the teeth as a whole.

5. The method of claim 4, wherein the deep learning neural network comprises a local feature extraction module for extracting the local feature vectors and a global feature extraction module for extracting the global feature vector.

6. The method of claim 5, wherein the local feature extraction module and the global feature extraction module are a Dynamic Graph Convolutional Neural Network (DGCNN) feature extractor.

7. The method of claim 5, wherein the local feature extraction module uniformly and non-repetitively samples a first predetermined number of facets, and the global feature extraction module uniformly and non-repetitively samples a second predetermined number of facets.

8. The method of claim 4, wherein the deep learning neural network comprises an encoding module and a decoding module, the encoding module is a bidirectional recurrent neural network which couples the feature vectors in two opposite directions along a predetermined tooth sequence, and the decoding module is a unidirectional recurrent neural network which generates the first digital data set based on vectors obtained by the couplings.

9. The method of claim 8, wherein the deep learning neural network further comprises an attention module configured to calculate for each tooth influence of poses of other teeth on its pose, based on a hidden state and vectors obtained from each step of coupling in the encoding module, and the decoding module generates the first digital data set based on the vectors obtained from the couplings and the calculated influences.

10. The method of claim 8, wherein an input of each recurrent unit of the encoding module comprises vectors Lt and G, where the Lt stands for the local feature vector of tooth #t, and the G stands for the global feature vector.

11. The method of claim 10, wherein an input of each recurrent unit of the decoding module comprises vectors TMt-1, Lt, G, Olt and Og, where TMt-1 stands for a displacement vector of a previous tooth in the tooth sequence which represents a displacement of the previous tooth from the initial tooth arrangement to the target tooth arrangement, Olt stands for a vector coupled by a corresponding recurrent unit of the encoding module, and the Og stands for the final vector of the step by step coupling of the encoding module.

12. The method of claim 11, wherein the vector Og is an average of a vector Og1 and a vector Og2, the vector Og1 is generated by the encoding module via coupling a vector S, which is concatenated from the vectors Lt and G, step by step in an initial input order, and the vector Og2 is generated by the encoding module via coupling the vector S step by step in a reverse input order.

13. The method of claim 12, wherein the vector Olt is an average of a vector Ol1$t$ and a vector Ol2$t$, the vector Ol1$t$ is generated by the encoding module via a coupling step #t corresponding to tooth #t, and the vector Ol2$t$ is generated by the encoding module via a reverse coupling step #t corresponding to tooth #t.

14. The method of claim 1, wherein the relative position relationship loss comprises a local relative position relationship loss which is a difference between relative position relationships between each tooth and its correlated teeth under the predicted target tooth arrangement and relative position relationships between each tooth and its correlated teeth under the ground truth target tooth arrangement, and a global relative position relationship loss which is a difference between relative position relationship between the upper jaw teeth as a whole and the lower jaw teeth as a whole under the predicted target tooth arrangement and relative position relationship between the upper jaw teeth as a whole and the lower jaw teeth as a whole under the ground truth target tooth arrangement.

15. The method of claim 1, wherein the loss function is defined as the following Equation (1)

$$\text{Loss} = a * R_{loss} + b * T_{loss} \qquad \text{Equation (1)}$$

wherein $R_{loss}$ is the transformation loss, $T_{loss}$ is the relative position relationship loss, and a and b stand for weights of $R_{loss}$ and $T_{loss}$, respectively.

16. The method of claim 1, wherein the features comprises a central point, a normal vector and vertices of a facet of each tooth.

* * * * *